US012718199B2

(12) United States Patent
Raghavan et al.

(10) Patent No.: US 12,718,199 B2
(45) Date of Patent: Aug. 25, 2026

(54) CHANGE MANAGEMENT ANALYSIS USING ORGANIZATIONAL NETWORK ANALYSIS METRICS

(71) Applicant: Microsoft Technology Licensing, LLC, Redmond, WA (US)

(72) Inventors: Ananthatejas Raghavan, Sunnyvale, CA (US); Amit Manghani, Alameda, CA (US); Tong Zhu, Seattle, WA (US); Man Ka Mandy Fung, Richmond (CA); Andrew Mark Thompson, Pepperell, MA (US); Giridharan Narayanan, Secaucus, NJ (US); Ramanan Vellore Ramesh, Fremont, CA (US); Samar Moezzi, Sammamish, WA (US); Gordon Wen Jie Li, Vancouver (CA); Shun Kong Cheung, Edmonton (CA); Samuel Andrei Popa, Coquitlam (CA); Kory James Opgenorth, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/989,405

(22) Filed: Dec. 20, 2024

(65) Prior Publication Data

US 2026/0179046 A1 Jun. 25, 2026

(51) Int. Cl.
*G06Q 10/10* (2023.01)
*G06F 16/901* (2019.01)

(52) U.S. Cl.
CPC ....... *G06Q 10/103* (2013.01); *G06F 16/9024* (2019.01)

(58) Field of Classification Search
CPC .... G06Q 10/103; G06Q 30/0207–0277; G06F 16/9024
USPC ...................................... 705/301, 14.1–14.73
See application file for complete search history.

(56) References Cited

U.S. PATENT DOCUMENTS

| | | | | |
|---|---|---|---|---|
| 2021/0004748 | A1* | 1/2021 | Ravi | G06Q 10/101 |
| 2021/0319402 | A1* | 10/2021 | Ramaswamy | H04L 51/52 |
| 2023/0216699 | A1* | 7/2023 | Raghavan | G10L 25/72 709/204 |

(Continued)

OTHER PUBLICATIONS

K. Shah et al. “Measuring change-Using Viva Insights organization network data to understand the impact of large-scale change”, Microsoft Customer Zero Story, 2024 (Year: 2024).*

(Continued)

*Primary Examiner* — Sam Refai
(74) *Attorney, Agent, or Firm* — Ray Quinney & Nebeker P.C.; Tiffany B. Healy

(57) ABSTRACT

The present disclosure relates to systems and methods for tracking changes in a collaboration graph. The systems and methods determine communication flow changes in the collaboration graph in response to a change occurring in the collaboration graph. The systems and methods use an algorithm to analyze the communications of groups within the collaboration graph and calculate a bridging index for the groups. The systems and methods provide insights on the changes in the communication flow of the collaboration graph using the bridging index.

20 Claims, 9 Drawing Sheets

(56) References Cited

U.S. PATENT DOCUMENTS

| | | | | |
|---|---|---|---|---|
| 2023/0297923 | A1* | 9/2023 | Dhaygude ............. | G06N 5/022 706/11 |
| 2024/0119417 | A1* | 4/2024 | Sorensen .............. | G06N 20/00 |

OTHER PUBLICATIONS

A. 2024, discloses the concept of HRbrain.ai, "Organisational Network Mapping for HR Leaders", retrieved from: https://hrbrain.ai/blog/organisational-network-mapping-for-hr-leaders/, Feb. 2, 2024 (Year: 2024).*

"Organisational Network Mapping for HR Leaders", Retrieved from: https://hrbrain.ai/blog/organisational-network-mapping-for-hr-leaders/, Feb. 2, 2024, 21 Pages.

Kang, et al., "Centralities in Large Networks: Algorithms and Observations", In Proceedings of the 2011 SIAM international conference on data mining, Apr. 28, 2011, pp. 119-130.

Karniol-Tambour, et al., "Distributed Algorithms and Optimization", Stanford University Spring, Apr. 22, 2015, 09 Pages.

Shah, et al., "Measuring change-Using Viva Insights organizational network data to understand the impact of large-scale change", Microsoft Customer Zero Story , 2024, 14 Pages.

* cited by examiner

CHANGE MANAGEMENT ANALYSIS USING ORGANIZATIONAL NETWORK ANALYSIS METRICS

BACKGROUND

A network of employees in an organization usually has key bridging entities which control the flow of information in the network. A large-scale organizational change could influence the bridging entities or groups and might alter the flow of information in the employee network. Users have a challenge of understanding and optimizing communication flows within organizations, particularly during structural changes. It is important for organizations to identify such changes in information flow to drive efficient changes. There is a need for a solution to track and analyze network changes, identify inefficiencies, and provide actionable insights for improving organizational communication.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving an input identifying a change in a collaboration graph representing collaborations among groups of individuals, wherein the change in the collaboration graph includes a modification of collaboration among the groups. The method includes calculating, for each group within the collaboration graph, a bridging index in response to the change using an algorithm that analyzes communication signals of each group and measures external communications from each group to other groups in the collaboration graph, wherein the bridging index quantifies information flow from each group to other groups in the collaboration graph. The method includes generating an insight using the bridging index for each group. The method includes presenting, on a user interface, the insight.

Some implementations relate to a device. The device includes a memory to store data and instructions; and a processor operable to communicate with the memory, wherein the processor is operable to: receive an input identifying a change in a collaboration graph representing collaborations among groups of individuals, wherein the change in the collaboration graph includes a modification of collaboration among the groups; calculate, for each group within the collaboration graph, a bridging index in response to the change using an algorithm that analyzes communication signals of each group and measures external communications from each group to other groups in the collaboration graph, wherein the bridging index quantifies information flow from each group to other groups in the collaboration graph; generate an insight using the bridging index for each group; and present, on a user interface, the insight.

Some implementations relate to a computer-readable storage medium including instructions that, when executed by a processor, cause the processor to: receive an input identifying a change in a collaboration graph representing collaborations among groups of individuals, wherein the change in the collaboration graph includes a modification of collaboration among the groups; calculate, for each group within the collaboration graph, a bridging index in response to the change using an algorithm that analyzes communication signals of each group and measures external communications from each group to other groups in the collaboration graph, wherein the bridging index quantifies information flow from each group to other groups in the collaboration graph; generate an insight using the bridging index for each group; and present, on a user interface, the insight.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
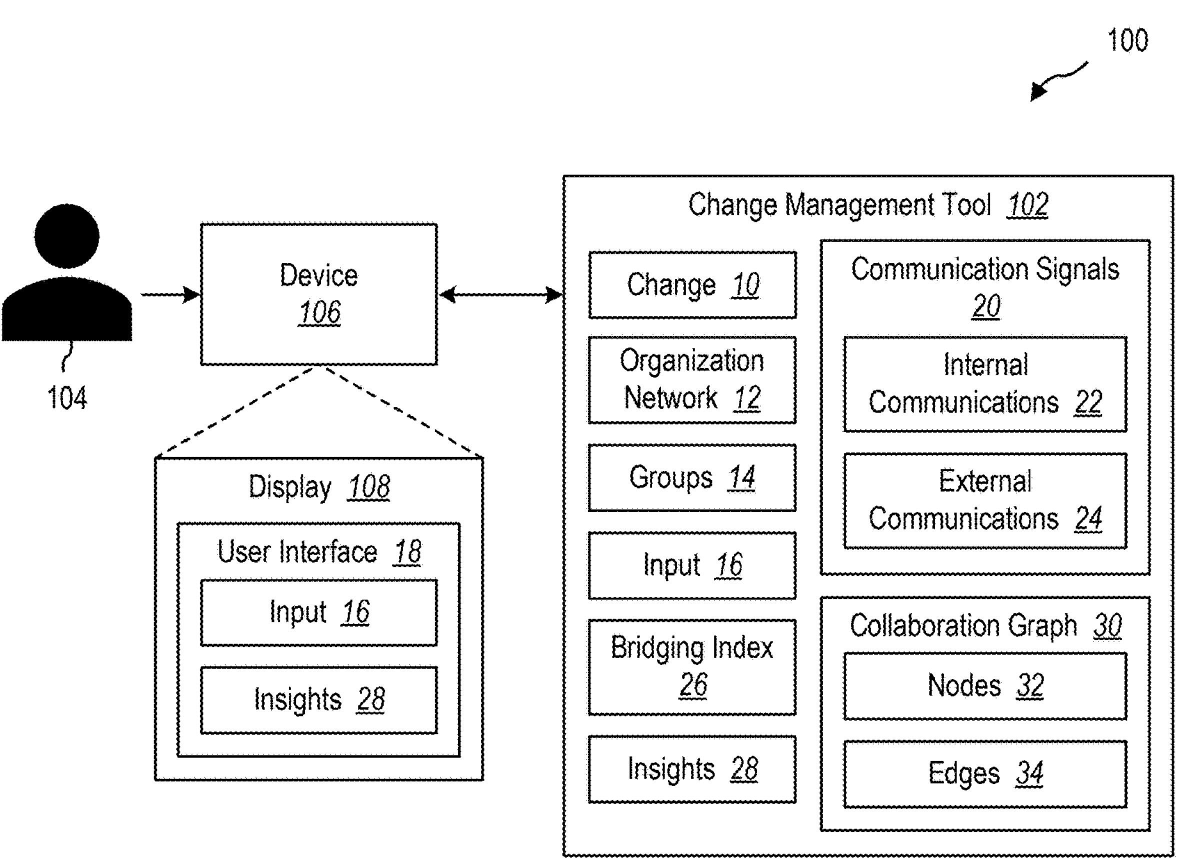
FIG. 1 illustrates an example environment for tracking changes in a collaboration graph in accordance with implementations of the present disclosure.

This disclosure generally relates to tracking changes in an organization network. A network of employees in an organization usually has key bridging entities which control the flow of information in the network. An organizational change (e.g., restructuring, agile transformation, or a change in the working model from remote working to hybrid working) could influence the bridging entities or groups and might alter the flow of information in the employee network. When a change occurs in an organization network (e.g., through a reorganization or new individuals join) there is a challenge of understanding how collaboration and team working patterns are impacted.

Existing solutions use betweenness centrality to try and identify how a change impacted communication flows for an individual within an organization. Betweenness centrality is a measure of how much a node acts as a knowledge broker in a network. Betweenness centrality is defined as the ratio of the number of shortest paths that pass through a vertex to the total number of shortest paths between every pair of vertices in the graph. Betweenness centrality is a computationally intensive measure, as it requires finding the shortest paths between every pair of vertices in the graph and computing the number of shortest paths that pass through each vertex. Betweenness centrality ends up being an O(n)^3 computation, which is extremely expensive in large graphs.

Betweenness centrality has a wide range of applications in various fields. Betweenness centrality is commonly used in network analysis to identify the most influential nodes in a network, such as social networks, transportation networks, and communication networks. For example, in social network analysis, betweenness centrality can be used to identify individuals who serve as bridges between different communities or groups. In transportation networks, betweenness centrality can be used to identify critical routes or intersections that, if disrupted, would have a significant impact on the overall network. In communication networks, betweenness centrality can be used to identify nodes that are critical for information flow. Additionally, betweenness centrality has been used in game theory to model strategic network formations, where nodes build connections subject to a budget constraint in order to maximize their betweenness in the network.

The present disclosure provides systems and methods for tracking changes in an organization network. An organization network is a network of individuals connected through collaborations. In some implementations, the organization network is represented as collaboration graph representing collaborations among groups of individuals within the organization network. The systems and methods determine communication flow changes in response to a change in the organization network and provide insights on the changes. In some implementations, the systems and methods use a graph database that tracks groups of individuals (nodes) and their communication path and organizational structure represented by relationship the nodes in the organizational hierarchy. Changes in the hierarchy lead to changes in communication paths and intensity. In some implementations, the systems and methods assess Organizational Network Analysis (ONA) metrics, such as a bridging index, to understand communication flow changes in response to shifts in the organizational structure. The systems and methods use an algorithm to reduce the computation complexity of betweenness centrality in calculating the bridging index. In some implementations, the systems and methods use the bridging index to identify which groups in the network are brokers of information flow.

The systems and methods further include custom-built quantitative and qualitative visualizations and employ a before-and-after comparison of networks to provide actionable insights on the impact of organizational changes. Once the impact of organizational change is detected, appropriate action(s) may be taken such as an action to alert users of the impact (e.g., by displaying a summary or explanation pertaining to the change), modify a setting or parameter of a computing system (e.g., a computer or a network of computers), isolate (e.g., disconnect or deactivate) an entity (e.g., user, device, service, process, application, etc.) within such a computer system or modify an access privilege associated with such an entity.

The present disclosure includes a number of practical applications that provide benefits and/or solve problems associated with tracking changes in an organization network. Examples of these applications and benefits are discussed in further detail below. One example benefit is improving the efficiency of an organization by understanding changes within the company without complex and time consuming analysis performed by human analysis. Another example benefit is displaying information about the bridging index for each group of individuals within the organization network to users in an easy to understand manner. Typically, an analyst with data science experience is needed to review and analyze the algorithms that are used to generate the bridging index. The systems and methods provide a user interface that makes it easy for the users to perform a before and after analysis of the organization and understand the updates in the organization in response to a change occurring in the organization.

In some implementations, the systems and methods use a graph database to track groups of individuals (nodes), communication paths, and the organization's hierarchy. The systems and methods apply the metrics over a group-to-group network view, enabling analysis based on grouping attributes, such as region and function types. Performing the analysis over a group view helps users find inefficiencies in various organizations by finding the change in bridging index across an organization. The user can improve the efficiency of the network by managing the flow of data by using the bridging index.

In some implementations, the systems and methods use an algorithm to reduce the computation complexity of betweenness centrality in calculating the bridging index. In some implementations, the algorithm is an approximation algorithm for the betweenness centrality. The algorithm characterizes random-walk betweenness, also known as the bridging index. The algorithm measures the importance of a node by aggregating the importance score of its incident edges. The importance score of an edge is the probability that information visiting an edge through a node will stay at the edge. The algorithm indicates that a node is more important than another node if information tends to flow through its incident edges rather than the other node's incident edges. The algorithm separates the high ranking individuals from the low ranking individuals.

In some implementations, the systems and methods use the bridging index to provide a bridging rank for each group in the network. In some implementations, the bridging rank is computed for each group in the network before and after the organizational change. The systems and methods use a user interface to present the analysis of the change. In some implementations, the systems and methods use custom-built quantitative and qualitative visualizations to provide actionable insights on the impact of organizational changes. Once the impact of organizational change is detected, appropriate action(s) may be taken. For example, organizational leaders take an action to mitigate the impact of the organization change if the impact is undesirable.

One technical advantage of the systems and methods of the present disclosure is an improvement in accuracy of information representing collaborations among users. The systems and methods use the signals (e.g., meeting information, emails, chats, messages, etc.) to represent the collaboration among users accurately. The systems and methods merge multiple signals (e.g., meeting information, emails, chats, messages, etc.) into a collaboration value based on a heuristic and use the collaboration value to represent the collaboration among users accurately. Another technical advantage of the systems and methods of the present disclosure is an improvement in the efficiency of the network by managing the flow of data. The systems and methods use the bridging index over a group view to find inefficiencies in the flow of data over the network and improve the flow of data. Another technical advantage of the systems and methods of the present disclosure is a reduction in computation complexity. The systems and methods use an algorithm to approximate betweenness centrality in computing the bridging index resulting in a reduction in the computation complexity of calculating the bridging index values.

Referring now to FIG. 1, illustrated is an example environment 100 for tracking changes in an organization network. The environment 100 includes a change management tool 102 that tracks a change 10 in an organization network 12 and determines communication flow changes in the organization network 12 in response to the change 10. The organization network 12 is a network of individuals connected through collaborations. A network is a system or structure that facilitates the sharing of information, resources, and collaboration within or between organizations. In some implementations, the organization network 12 is represented in a graph database. One example of the change 10 in the organization network 12 is a reorganization. Another example of the change 10 in the organization network 12 is a new individual join the organization. Another example of the change 10 in the organization network 12 is modifying a working environment (e.g., moving to hybrid work or moving to remote work). In some implementations, the change 10 in organization network 12 triggers a modification in collaboration among individuals within the organization network 12. For example, a modification in collaboration includes a change in intensity in communication among individuals within the organizational network 12. Another example of a modification in collaboration includes a new communication path established between individuals within the organization network 12. Another example of a modification in collaboration includes removing a communication path among individuals.

In some implementations, the change management tool 102 receives an input 16 indicating that the change 10 occurred. For example, the change management tool 102 automatically receives updated information with the change 10. Another example includes the change management tool 102 receives the input 16 from a user 104 identifying the change 10 using a device 106.

The change management tool 102 is in communication with the device 106 via a network. In some implementations, the change management tool 102 is on a cloud server remote from the device 106 accessed through the network. For example, the change management tool 102 is hosted on virtual machines in the cloud. The network may include one or multiple networks and may use one or more communication platforms and/or technologies suitable for transmitting data. The network may refer to any data link that enables transport of electronic data between devices of the environment 100. The network may refer to a hardwired network, a wireless network, or a combination of a hardwired network and a wireless network. In one or more implementations, the network includes the internet. The network may be configured to facilitate communication between the various computing devices. The server may include one or more computing devices (e.g., including processing units, data storage, etc.) organized in an architecture with various network interfaces for connecting to and providing data management and distribution across one or more client systems. While one device is illustrated, the change management tool 102 may be in communication with a plurality of devices.

A user 104 accesses the change management tool 102 using the device 106. The device 106 may be representative of one or multiple devices and may refer to various types of computing devices. For example, the device 106 may include a mobile device such as a mobile telephone, a smartphone, a personal digital assistant (PDA), a tablet, a laptop, or any other portable device. Additionally, or alternatively, the device 106 may include one or more non-mobile devices such as a desktop computer, server device, or other non-portable device. In some implementations, the device 106 may be communicatively coupled (e.g., wired or wirelessly) to a display 108 having a user interface 18 thereon for providing a display of system content.

In some implementations, the change management tool 102 is accessed through the network. For example, a uniform resource locator (URL) configured to an end point of the change management tool 102 is provided to the device 106 that the user 104 may access using a browser on the device 106. Another example includes an application on the device 106 of the user 104 provides access to the change management tool 102.

The user 104 uses the device 106 to provide an input 16 to the change management tool 102. For example, the input 16 includes the change 10. Another example includes the input 16 identifies a time period prior to the change 10 and a time period after the change 10 that the change management tool 102 uses in comparing communication flow patterns before and after the change 10 occurred. Another example includes the input 16 identifies a group 14 of individuals to focus on in performing the analysis. In some implementations, the input 16 is a template that the user 104 fills in with information that the change management tool 102 uses in tracking the changes to communication flows. For example, the change management tool 102 provides a pre-defined template that the user 104 uses in providing information to the change management tool 102. Another example includes the change management tool 102 provides a template that the user 104 uses in selecting an analysis for the change management tool 102 to perform. In some implementations, the input 16 is multi-modal input. For example, the input 16 includes any combination of text, video, images, audio, or graphs.

The change management tool 102 identifies groups 14 in the organization network 12. The groups 14 are an identified set of individuals (e.g., employees) that are identified using their organizational attributes. For example, "Job Title" is an organizational attribute and all employees that have "Software Engineer" as a job title belong to the "Software Engineer" group. In some implementations, the change management tool 102 identifies segments in the organization network 12. Segments are an identified sub-group of individuals within the group, who are identified by another organizational attribute different than the one that defines the group. For example, "Level" is an organizational attribute and all employees that belong to level "Junior" within the group of "Software Engineer," belong to the "Software Engineer-Junior" segment.

The change management tool 102 identifies communication signals 20 that each group 14 sends or receives. For example, the change management tool 102 obtains data sent or received by each group 14 and determines whether the data relates to communication or collaboration activities among individuals. One example communication signal 20 is a meeting invitation sent by an individual in the group 14 or received by an individual in the group 14. Another example communication signal 20 is an email sent by an individual in the group 14 or received by an individual in the group 14. Another example communication signal 20 is a chat message sent by an individual in the group 14 or received by an individual in the group 14. The change management tool 102 uses the communication signals 20 to represent the collaborations of each group 14.

In some implementations, the change management tool 102 identifies internal communications 22 within a group 14 using the communication signals 20. Internal communications 22 are communications among members of a same group. In some implementations, the change management tool 102 identifies external communications 24 for a group 14. External communications 24 are communications from an individual within a group to another individual within a different group.

In some implementations, the change management tool 102 calculates a bridging index 26 using the information from the communication signals 20 for each group 14. The bridging index 26 estimates the amount of data flowing to and/or from each group 14. The change management tool 102 uses the bridging index 26 to identify a flow of data and identify knowledge brokers within a group 14. A knowledge broker is an individual through whom more information passes and has more control over the organization network 12. In some implementations, the knowledge broker is an individual that servers as a bridge between different groups 14 by communicating with the different groups 14.

In some implementations, the change management tool 102 uses the external communications 24 for each group 14 in calculating the bridging index 26. For example, the change management tool 102 excludes the internal communications 22 among individuals within the group 14 in calculating the bridging index 26. The change management tool 102 computes a bridging index 26 for an individual of the group 14 using the external communications 24 for the individual. The change management tool 102 computes the bridging index 26 for each individual of the group 14. In some implementations, the change management tool 102 sums the bridging index 26 for each individual in the group 14 and uses the sum of the bridging indexes to identify a bridging nature of the group 14 (e.g., the bridging index 26 for the group 14). The bridging index 26 for the group 14 is the aggregation of the bridging index 26 for each individual within the group 14. For example, the external communications for the group 14 are the external communication for the individuals within the group 14.

In some implementations, the change management tool 102 generates insights 28 using the bridging index 26. The insights 28 provide information about the change 10 and any changes in communication flows in response to the change 10. In some implementations, the insight 28 is a statistical change in communication flows that impact the organization.

In some implementations, the insights 28 are generated at a group level. In some implementations, the insights 28 are generated at a segment level. Computing the bridging index 26 at the group level allows the change management tool 102 to generate the insights 28 at the different levels (e.g., group, segments, individual) using a single metric without having to compute the metric at the different levels of granularity.

In some implementations, the change management tool 102 identifies a contribution of segments within the group 14 to the bridging nature of the group 14. The change management tool 102 sums the bridging index 26 calculated for the individuals within the segment to identify the contribution of the segment to the bridging nature of the group 14. For example, if a group is "United States" and the segments included "PST, EST, and MT," the change management tool 102 calculates the bridging nature of each segment by summing the bridging index 26 for the individuals within each segment. The change management tool 102 can generate an insight 28 using the bridging index 26 indicating that the PST segment contributes more to the bridging nature of the "United States" group as compared to the EST segment and the MT segment.

In some implementations, the change management tool 102 creates a collaboration graph 30 for the organization network 12 with the nodes 32 representing groups 14 within the organization network 12 and the edges 34 representing communication signals 20 provided by the groups or received by the groups. The collaboration graph 30 represents collaborations among the groups 14 within the organization network 12. In some implementations, the edges 34 include weights indicating the collaboration hours each group has spent in collaboration with the other groups.

In some implementations, the change management tool 102 uses the collaboration graph 30 in computing the bridging index 26 for the group 14. The change management tool 102 uses message passing between the nodes 32 (e.g., groups 14) with a global synchronization barrier to compute the bridging index 26. The change management tool 102 performs an iterative computation and sends the weights of the edges 34 to a source node 32 to compute a sum of the outgoing edge weights multiplied by the edge weight followed by an inverse of the value. The value is used to provide a score for the node 32. In some implementations, the score is an estimation of an amount of data flowing through the node 32 (e.g., email communications to the node 32, chat sessions that involve the node 32, or meeting invitations that involve the node 32). The change management tool 102 identifies the edges 34 that are a more common path for the message being transferred across the nodes 32. In some implementations, the change management tool 102 filters out internal communications 22 among the group 14 and uses the external communications 24 in determining the score for the node 32.

The change management tool 102 ranks the nodes 32 in the graph using the score. The change management tool 102 determines the bridging index 26 based on the rank. For example, the nodes 32 with a higher rank (e.g., score) have more communications as compared to the nodes 32 with a lower rank (e.g., score). The change management tool 102 uses the ranks to easily identify which groups 14 in the network are communication contributors. For example, the change management tool 102 identifies the top five groups 14 for controlling the flow of information in the organization network 12. Another example includes the change management tool 102 identifies the group 14 that communicates the most with other groups in the organization network 12. Another example includes the change management tool 102 identifies the groups 14 who infrequently communicate with other groups of the organization network 12.

In some implementations, the change 10 triggers a modification of collaboration among groups 14 within the collaboration graph 30. For example, a modification of collaboration includes a change in intensity in communications among the groups 14. One example of a change in intensity in communication is an increase in email communication among the groups 14. Another example of a change in intensity in communication is a decrease in email communication among the groups 14. Another example of a change in intensity in communication is an increase in meetings scheduled among the groups 14. Another example of a change in intensity in communication is a decrease in meetings scheduled among the groups. Another example of a change in intensity in communication is an increase in document collaboration among the groups 14. Another example of a change in intensity in communication is a decrease in document collaboration among the groups 14. Another example of a change in intensity in communication is an increase in sending messaging (e.g., using a chat or messaging application) among the groups 14. Another example of a change in intensity in communication is a decrease in sending messages among the groups 14.

Another example of a modification of collaboration includes a new communication path established between the groups 14. One example of a new communication path is a new meeting scheduled between two groups meeting for the first time. Another example of a new communication path is an email sent to groups for the first time. Another example of a modification of collaboration includes removing a communication path between the groups 14. One example of removing a communication path is groups stop communicating with one another (e.g., stop meeting with each other, stop sending messages between the groups, or stop sending emails between the groups).

In some implementations, the change management tool 102 generates an insight 28 identifying the communication contributors in a group 14 using the bridging index 26. In some implementations, the insight 28 is a statistical change in an intensity of a communication path among groups in the collaboration graph 30. In some implementations, the change management tool 102 generates an insight 28 illustrating a change (e.g., an increase or decrease) in communication for a group 14 using the bridging index 26 of the group 14 from a time period prior to the change 10 occurring as compared to the bridging index 26 of the group 14 from a time period after the change 10 occurred. In some implementations, the change management tool 102 generates an insight 28 illustrating that the communication for a group 14 remained the same in response to the change 10 occurring in the organization network 12.

In some implementations, the change management tool 102 displays the insight 28 on the user interface 18. One example insight 28 is a graph illustrating information about the top groups 14 for an organization network 12 contributing to collaborations. In some implementations, the graph is an interactive graph allowing the user 104 to select nodes in the graph and obtain additional information. For example, the user 104 selects a group 14 (e.g., a node in the graph) and the graph provides information for the top individuals within the group 14 that contribute to collaborations. Another example insight 28 includes a chart illustrating quantitative information about changes in communication for a group 14 before and after a change 10 occurred in the organization network 12.

The insights 28 provide visualizations with qualitative insights about the shape and size of the organization network 12, along with the position of the information brokers in the organization network 12 (individuals that facilitate communication flows). The insights 28 provide an at-a-glance perspective into the significance of groups 14 in the organization network 12 and help the user 104 identify if the groups 14 are in the center of the organization network 12 or in the periphery. In some implementations, the insights 28 provide information into the segments within a group 14 that contribute to the bridging nature of the group 14, helping the user 104 gather essential information about the organization network 12. In some implementations, the insights 28 are used by the user 104 to measure how the change 10 is impacting the organization network 12 and communications among the groups 14 of the organization network 12.

The change management tool 102 presents the information relating to the bridging index 26 to the user 104 in an easy to understand manner so that the user 104 is able to easily understand how a change 10 impacted the flow of information in the organization network 12. In some implementations, the insights 28 are used to perform an action on the organization network 12. One example action is modifying a flow of communication among groups 14 in the organization network 12. Another example action is moving an individual to a different group 14. Another example action is modifying access permissions of individuals in response to new groups assignments. Another example action is implementing another change 10 on the organization network 12. In some implementations, the insights 28 are used to perform a network communication improvement operation.

In some implementations, one or more computing devices (e.g., servers and/or devices) are used to perform the processing of the environments 100. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the change management tool 102 is implemented on a single computing device. Moreover, in some implementations, one or more subcomponent of the feature and functionalities discussed herein may be implemented are processed on different server devices of the same or different cloud computing networks. For example, the change management tool 102 is implemented on different server devices.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
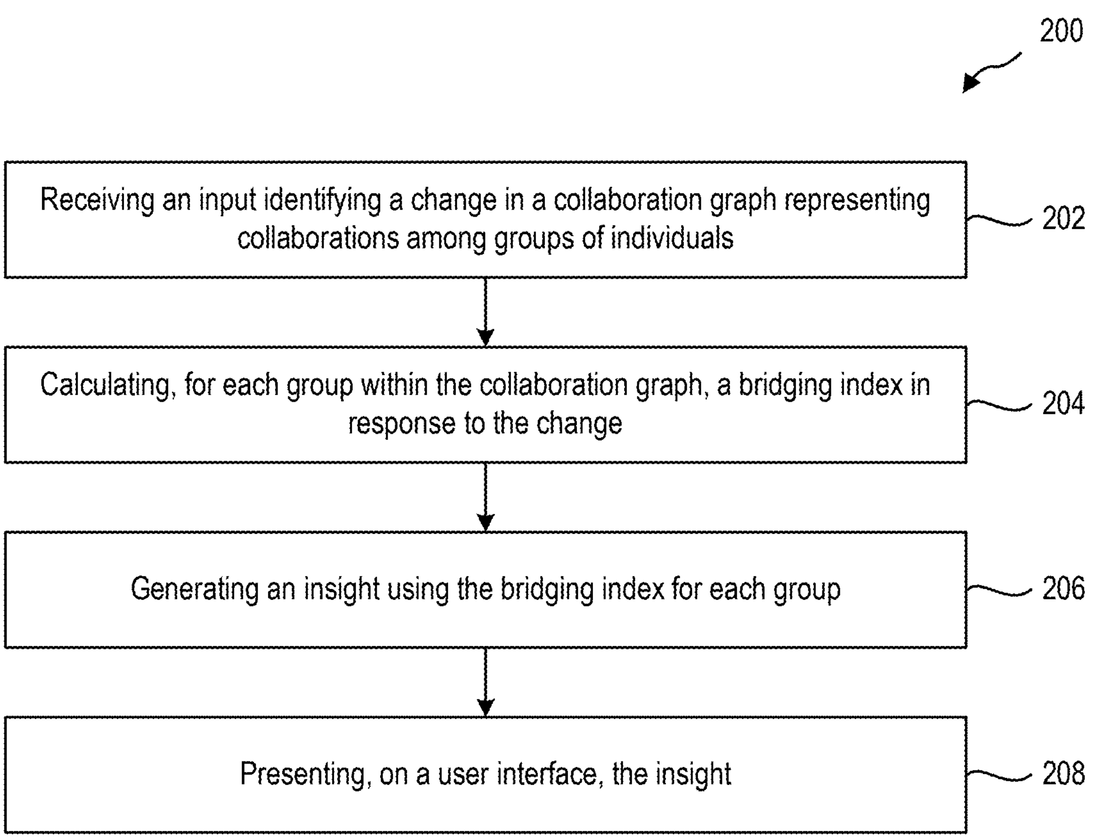
FIG. 2 illustrates an example method for tracking changes in a collaboration graph in accordance with implementations of the present disclosure.

FIG. 2 illustrates an example method 200 for tracking changes in a collaboration graph. The actions of the method 200 are discussed below in reference to FIG. 1.

At 202, the method 200 includes receiving an input identifying a change in a collaboration graph representing collaborations among groups of individuals. The change management tool 102 receives an input 16 identifying a change 10 in a collaboration graph 30. One example of the change 10 is an organizational change within an organization. Another example of the change 10 is a reorganization of a company (e.g., the organization network 12). Another example of the change 10 is a new individual joins the organization network 12. Another example of the change 10 is modifying a working environment (e.g., moving to hybrid work or moving to remote work) of individuals within the organization network 12.

In some implementations, the change 10 in the collaboration graph 30 includes a modification of collaboration among the groups in the collaboration graph 30. Examples of a modification of collaboration among the groups include a change in intensity in communication among the groups, a new communication path established among the groups, and removing a communication path among the groups. Examples of the change in intensity in communication among the groups include an increase in email communication among the groups, a decrease in email communication among the groups, an increase in meetings scheduled among the groups, a decrease in meetings scheduled among the groups, an increase in document collaboration among the groups, a decrease in document collaboration among the groups, an increase in sending messaging among the groups, and a decrease in sending messages among the groups.

In some implementations, the input 16 is a template that the user 104 fills in with information that the change management tool 102 uses in tracking the changes to communication flows. For example, the change management tool 102 provides a pre-defined template that the user 104 uses in providing information to the change management tool 102.

In some implementations, the input 16 identifies a time period prior to the change 10 and a time period after the change 10 that the change management tool 102 uses in comparing communication flow patterns before and after the change 10 occurring. Another example includes the input 16 identifies a group 14 of individuals to focus on in performing the analysis.

At 204, the method 200 includes calculating, for each group within the collaboration network, a bridging index in response to the change. In some implementations, the change management tool 102 calculates a bridging index 26 for each group 14 within the collaboration graph 30 in response to the change 10. The bridging index 26 quantifies information flow from the group 14 to other groups in the collaboration graph 30. In some implementations, the bridging index 26 is calculated for each group 14 before the change 10 in the collaboration graph 30 and after the change 10 in the collaboration graph 30 and the insights 28 include the before the change bridging index and the after the change bridging index.

In some implementations, the change management tool 102 uses an algorithm that analyzes communication signals 20 (e.g., email communications, meeting invitations, and chats) of the group 14 and measures external communications 24 from the group to other groups in the collaboration graph 30. In some implementations, the algorithm excludes internal communications 22 among individuals within the group 14 from the bridging index calculation.

In some implementations, the algorithm traverses the groups 14 in the collaboration graph 30. The algorithm calculates the bridging index 26 for each group 14 in the collaboration graph 30. For example, each node 32 in the graph 30 corresponds to a group 14 and each edge 34 represents communications from each node 32. In some implementations, each edge 34 includes a weight that quantifies an amount of communications for each node 32 in the collaboration graph 30 and the sum of weights from each edge 34 is used in calculating the bridging index 26 for each node 32 (e.g., each group 14). In some implementations, the internal communications within the group 14 are removed from calculating the bridging index 26 and the algorithm calculates the bridging index 26 by summing the weights of the edges 34 indicating external communications 24 from the group 14 to other groups in the collaboration graph 30. In some implementations, the algorithm characterizes random-walk betweenness, also known as the bridging index 26. The algorithm measures the importance of a node 32 by aggregating the importance score of its incident edges 34. The importance score of an edge 34 is the probability that information visiting an edge 34 through a node 32 will stay at the edge 34. The algorithm indicates that a node is more important than another node if information tends to flow through its incident edges rather than the other node's incident edges. The algorithm separates the high ranking individuals from the low ranking individuals.

At 206, the method 200 includes generating an insight using the bridging index for each group. In some implementations, the change management tool 102 generates an insight 28 using the bridging index 26. In some implementations, the insight 28 is a statistical change in an intensity of a communication path among groups in the collaboration graph 30 that impacts an organization. In some implementations, the insight 28 provides qualitative visualizations of the bridging index 26 for the group 14. In some implementations, the insight 28 provides information on a segment of the group 14 and a contribution of the segment to the bridging index 26 for the group 14. In some implementations, the insight 28 is implemented as at least one type of data of a set of types that include a statistical change in a communication flow that impacts an organization network 12, a statistical change in an intensity of a communication path among groups 14 in the collaboration graph 30, or quantitative information about changes in communication for a group 14 before and after the change 10 occurred in an organization network 12.

At 208, the method 200 includes presenting, on a user interface, an insight with the bridging index. In some implementations, the change management tool 102 presents, on the user interface 18, the insight 28 with the bridging index 26. For example, the change management tool 102 receives a graph view request for the insight 28 and presents on the user interface 18 the insight 28 in an interactive graph that provides additional information for a selected group 14 and the bridging index 26 for the selected group in response to receiving a selection on the interactive graph. Another example includes the change management tool 102 receives a chart view request for the insight 28 and presents on the user interface 18 the insight 28 a chart that provides quantitative information of the bridging index 26 for the group 14.

In some implementations, the method 200 optionally includes performing an action in response to the insight. For example, the change management tool 102 performs an action in response to the insight 28. Another example includes the user 104 performs an action in response to the insight 28. In some implementations, the action is modifying a flow of information in the network between groups 14 of the organization network 12. In some implementations, the action is further modifications to an organization or company.

The method 200 provides analysis over a group view within a collaboration graph 30 and helps users in easily understanding how a change 10 affected communications within the collaboration graph. Performing the analysis over a group view helps users find inefficiencies in various organizations by finding the change in the bridging index 26 across an organization. The user 104 can improve the efficiency of the organization network 12 by managing the flow of data within the organization network 12 by using the bridging index 26.

Figure 3A:
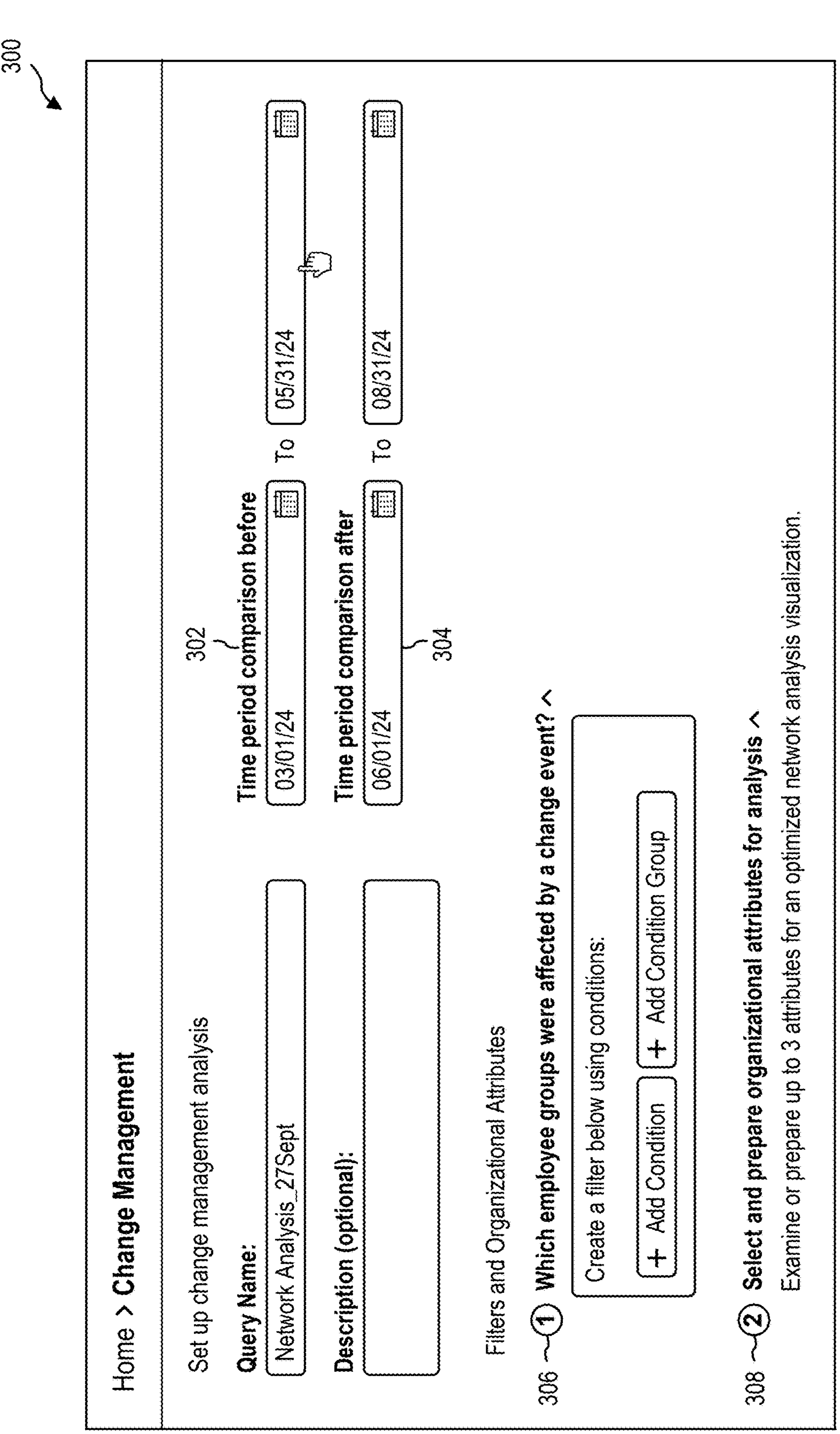
FIGS. 3A-3F illustrate example graphical user interfaces in accordance with implementations of the present disclosure.

FIG. 3A illustrates an example graphical user interface (GUI) 300 of the input 16 (FIG. 1) provided by the user 104 (FIG. 1) displayed on the user interface 18 (FIG. 1). In some implementations, the input 16 is a predefined template that the user 104 uses to provide information to the change management tool 102 related to the change 10 (FIG. 1) that occurred in an organization network 12 (FIG. 1). In some implementations, the change management tool 102 uses the information provided in the GUI 300 in calculating the bridging index 26 (FIG. 1) for the groups 14 (FIG. 1) in the organization network 12 and generating the insights 28 regarding the bridging index 26 for each group 14.

In some implementations, the user 104 provides a before time period 302 with dates that occurred prior to the change 10 (FIG. 1) and an after time period 304 with dates that occurred after the change 10. In some implementations, the user 104 creates a filter 306 to identify which groups 14 (FIG. 1) were affected by the change 10. For example, the filter 306 includes conditions added by the user 104 to remove groups in the organization network 12 from the analysis performed by the change management tool 102. Another example includes the filter 306 includes conditions added by the user 104 to add groups in the organization network 12 to the analysis performed by the change management tool 102. In some implementations, the user 104 provides organizational attributes 308 for the analysis. One example organizational attribute 308 includes customized values that combine, rename, or apply rules to values to create a better comparison between time periods (e.g., the before time period 302 and the after time period 304) by the change management tool 102. Another example organization attribute 308 includes focusing on values by specifying values to emphasize in the reports generated by the change management tool 102.

Figure 3B:
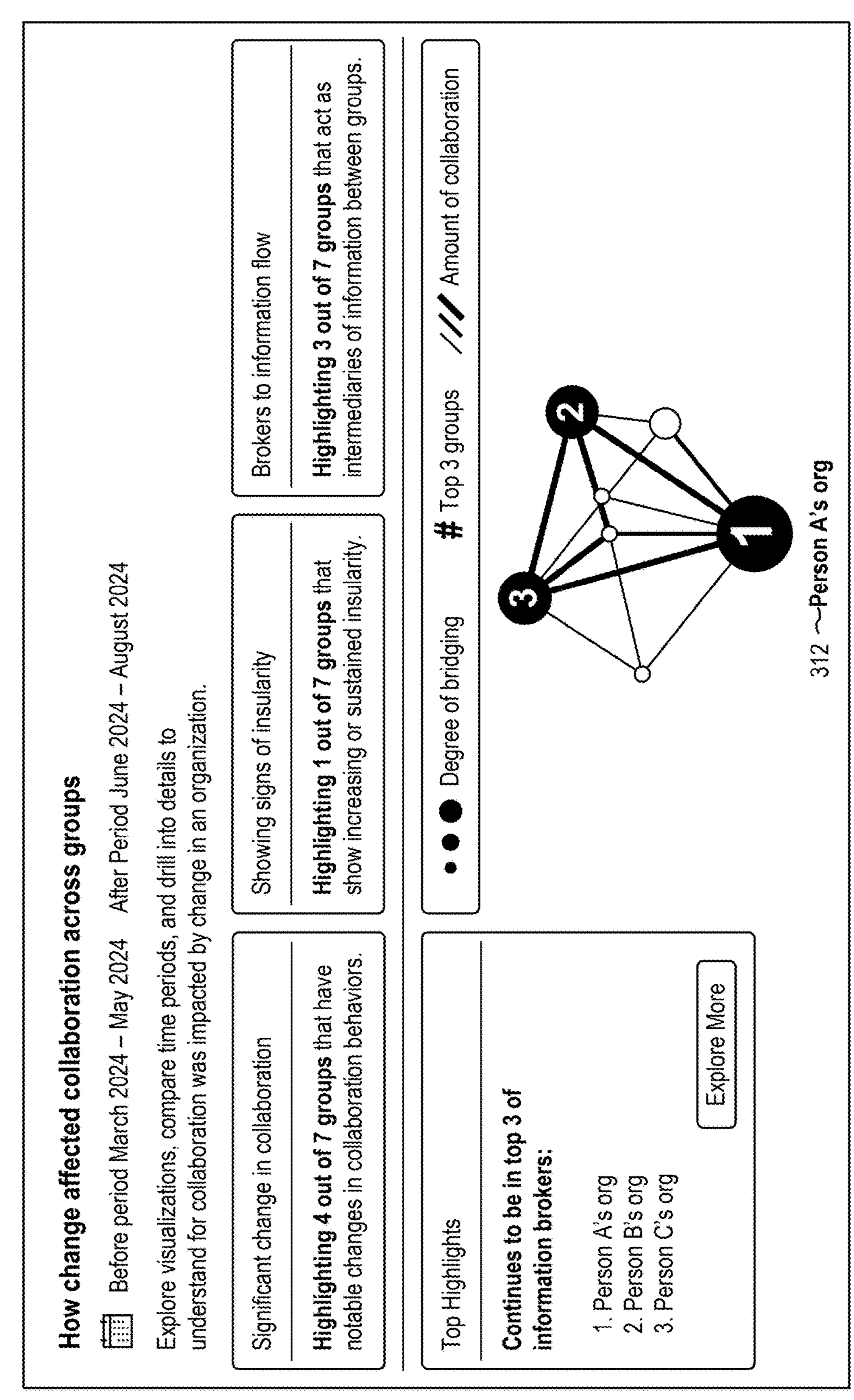

FIG. 3B illustrates an example GUI 310 of insights 28 (FIG. 1) displayed on the user interface 18 (FIG. 1). In some implementations, the change management tool 102 generates the insights 28 in response to the input 16 (FIG. 1) provided identifying the change 10. In some implementations, the change management tool 102 (FIG. 1) generates the insights 28 displayed on the GUI 310 in response to the information provided in FIG. 3A.

In some implementations, the insights 28 include information about a change in collaboration across the before time period and the after time period of the change 10. In some implementations, the insights 28 include information about insularity of the groups 14 in response to the change 10. In some implementations, the insights 28 include information about brokers of information flow in the organization network 12 (e.g., groups 14 that contribute to the information flow in the organization network 12).

In some implementations, the insights 28 includes a graph 312 that the user 104 (FIG. 1) can use to identify which groups 14 (FIG. 1) are the top brokers of information in the organization network 12 (FIG. 1) and learn about updates in a position of the top brokers across the before time period and the after time period of the change 10 (e.g., an organizational change).

In some implementations, the graph 312 is interactive and provides additional information in response to the user 104 selecting a node or an edge of the graph 312. The user 104 can explore deeper into the organization network 12 using the graph 312 visualization and the chart view visualization, which provide qualitative and quantitative insights to the users.

Figure 3C:
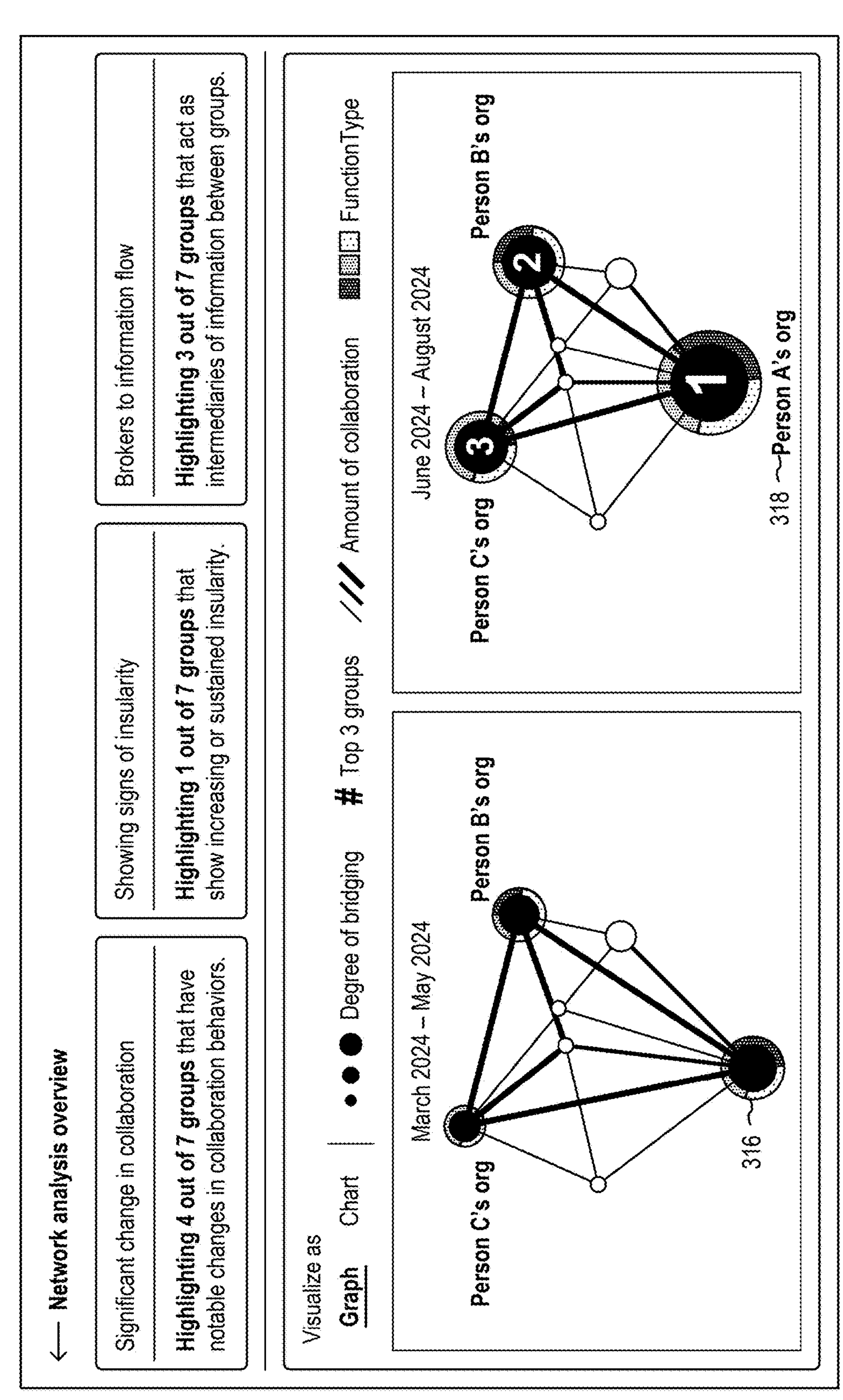

FIG. 3C illustrates an example GUI 314 of insights 28 (FIG. 1) displayed on the user interface 18 (FIG. 1). In some implementations, the change management tool 102 generates the insights 28 in response to the input 16 (FIG. 1) provided identifying the change 10 (FIG. 1). In some implementations, the change management tool 102 (FIG. 1) generates the insights 28 displayed on the GUI 310 in response to the information provided in FIG. 3A.

In some implementations, the insights 28 provide a side-by-side qualitative visualization with a before and after paradigm showing changes in information flow in the organization network 12 (FIG. 1). The insight 28 includes a graph 316 illustrating the information flow between the groups 14 of the organization network 12 prior to the change 10 occurring and a graph 318 illustrating the information flow between the groups 14 of the organization network 12 after the change 10 occurred. For example, each node in the graphs 316, 318 represents a group 14 in the organization network 12 and the numbers on the nodes represent a rank indicating which group is a higher broker of information relative to the other groups. In some implementations, the number on the nodes is generated using the bridging index 26. The side-by-side network visualization provides qualitative insights about the shape and size of the organization network 12, along with the position of the key information brokers in the organization network 12 providing an at-a-glance perspective into the significance of groups 14 in the organization network 12 and helps the user 104 identify if the groups 14 are in the center of the organization network 12 or in the periphery. In some implementations, the insights 28 rank the top brokers of information in the organization network 12 to provide a visual aid to guide the analysis.

Figure 3D:
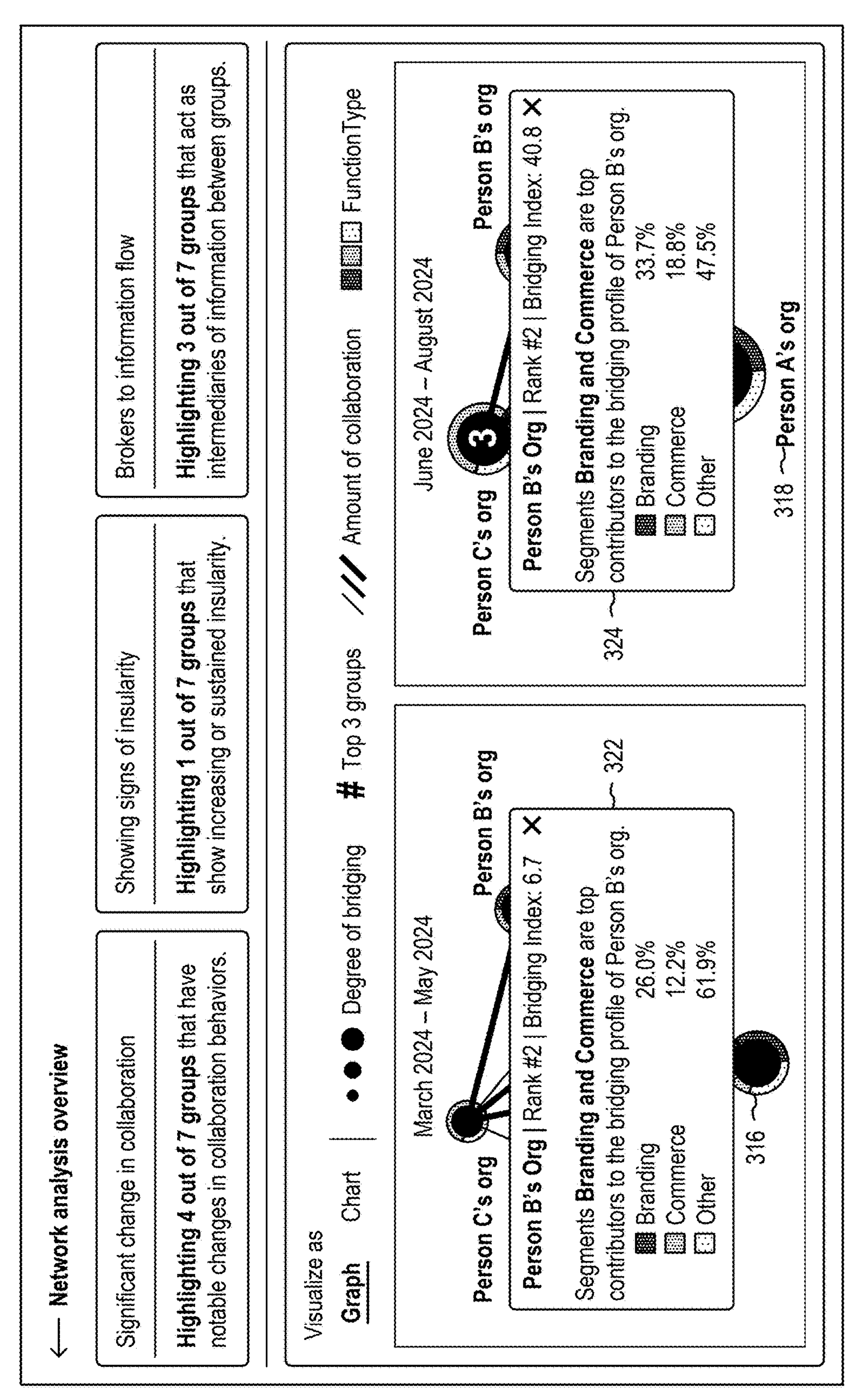

FIG. 3D illustrates an example GUI 320 of insights 28 (FIG. 1) displayed on the user interface 18 (FIG. 1). In some implementations, the change management tool 102 generates the insights 28 in response to the input 16 (FIG. 1) provided identifying the change 10 (FIG. 1). In some implementations, the change management tool 102 (FIG. 1) generates the insights 28 displayed on the GUI 310 in response to the information provided in FIG. 3A.

In some implementations, the insights 28 provide information 322, 324 about contributions of segments within a group 14 to the bridging nature (e.g., the bridging index 26) of the group 14. For example, if the user 104 selects a node (e.g., a group 14) in the graph 316 the information 322 provides details about the segments within the selected group 14 and the user 104 may use the information 322 to identity which segments within the group 14 contributed to the bridging nature of the group 14. For example, if the user 104 selects a node (e.g., a group 14) in the graph 318 the information 324 provides details about the segments within the selected group 14 and the user 104 may use the information 324 to identify which segments within the group 14 contributed to the bridging nature of the group 14.

In some implementations, the information 322 is prior to the change 10 occurring and the information 324 is after the change occurred and the user 104 is able to use the information 322 and the information 324 to identify if any changes occurred in the segments contributing to the bridging index 26 of the group 14 in response to the change 10 occurring or if the segments contributing nature to the bridging index 26 of the group 14 remained the same.

Figure 3E:
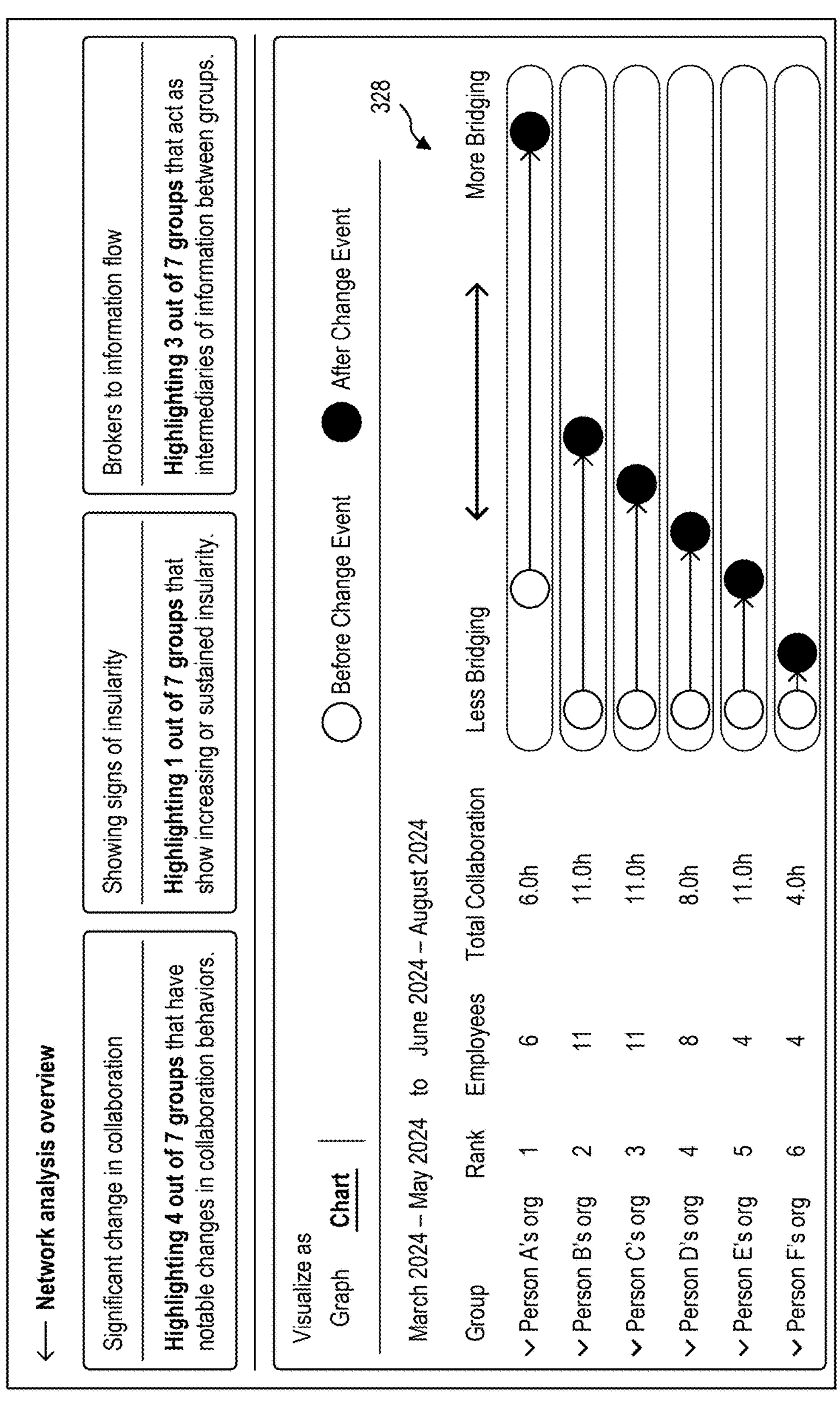

FIG. 3E illustrates an example GUI 326 of insights 28 (FIG. 1) displayed on the user interface 18 (FIG. 1). In some implementations, the change management tool 102 generates the insights 28 in response to the input 16 (FIG. 1) provided identifying the change 10 (FIG. 1). In some implementations, the change management tool 102 (FIG. 1) generates the insights 28 displayed on the GUI 310 in response to the information provided in FIG. 3A.

In some implementations, the insight 28 is a chart 328 that illustrates both the quantitative change in the bridging nature of the groups 14 (FIG. 1) in a network 12 (FIG. 1) and the state of the groups 14 in the before time period prior to a change 10 occurring and the after time period after the change 10 occurred. For example, the chart 328 chart illustrates whether a group 14 is leaning more towards being a broker of information. For any given group 14, a first color (e.g., a dark blue circle) indicates the after state (e.g., a state of the group 14 after the change 10 occurred) and a second color (e.g., the lighter blue circle) indicates the before state (e.g., a state of the group 14 before the change 10 occurred). Movement from the right to the left illustrates a decrease in the bridging index 26 (FIG. 1) score for the group 14 after the change 10 event. Movement from left to right indicates an increase in the bridging index 26 score for that group 14 after the change 10 event.

Figure 3F:
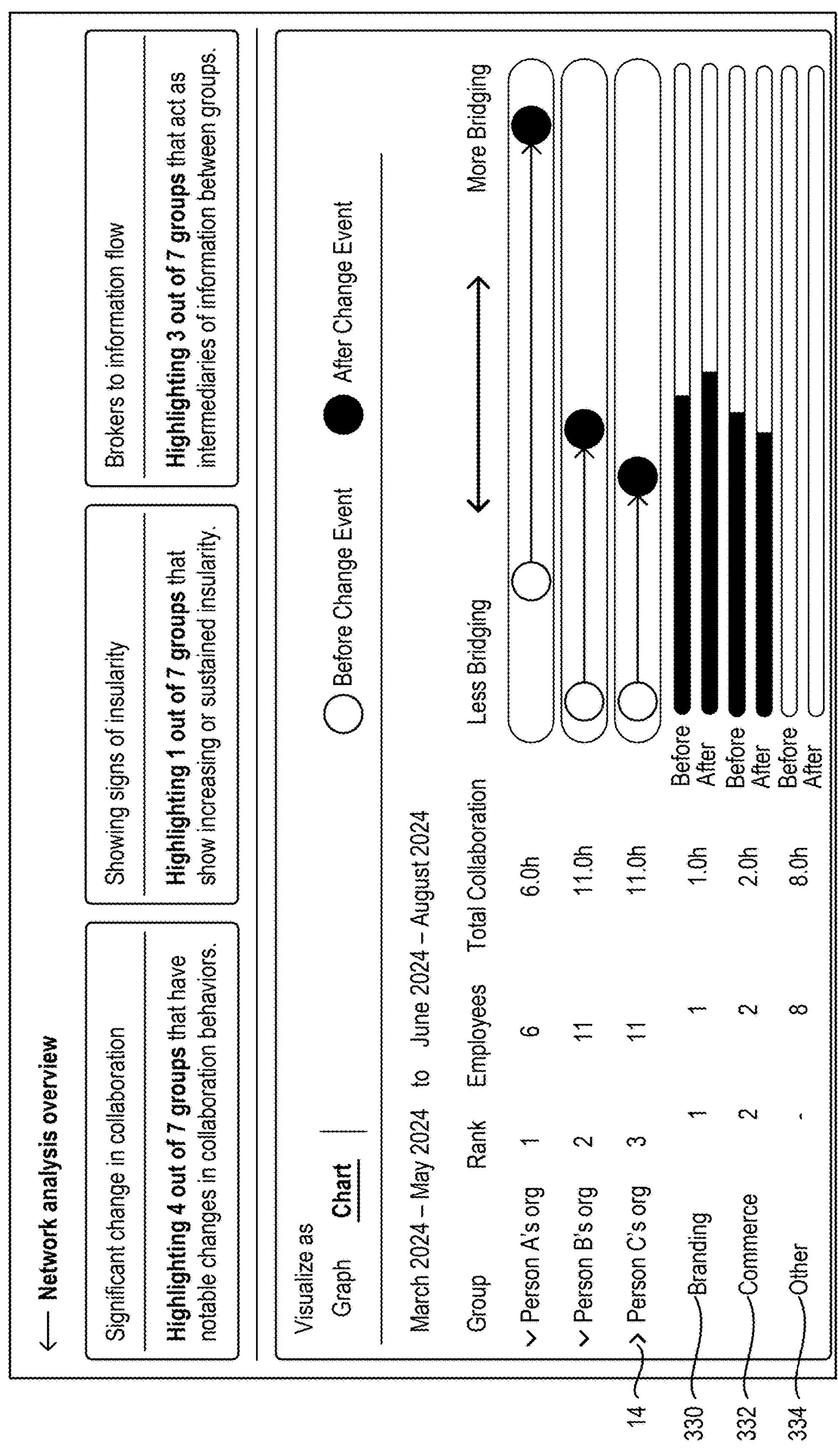

FIG. 3F illustrates an example of the chart 328 illustrating segments contributions to the bridging index 26 (FIG. 1) of the group 14. The chart 328 illustrates the different segments 330, 332, 334 of a selected group 14. The chart 328 provides a quantitative view about the bridging nature of the groups and segments in the organization network 12.

Figure 4:
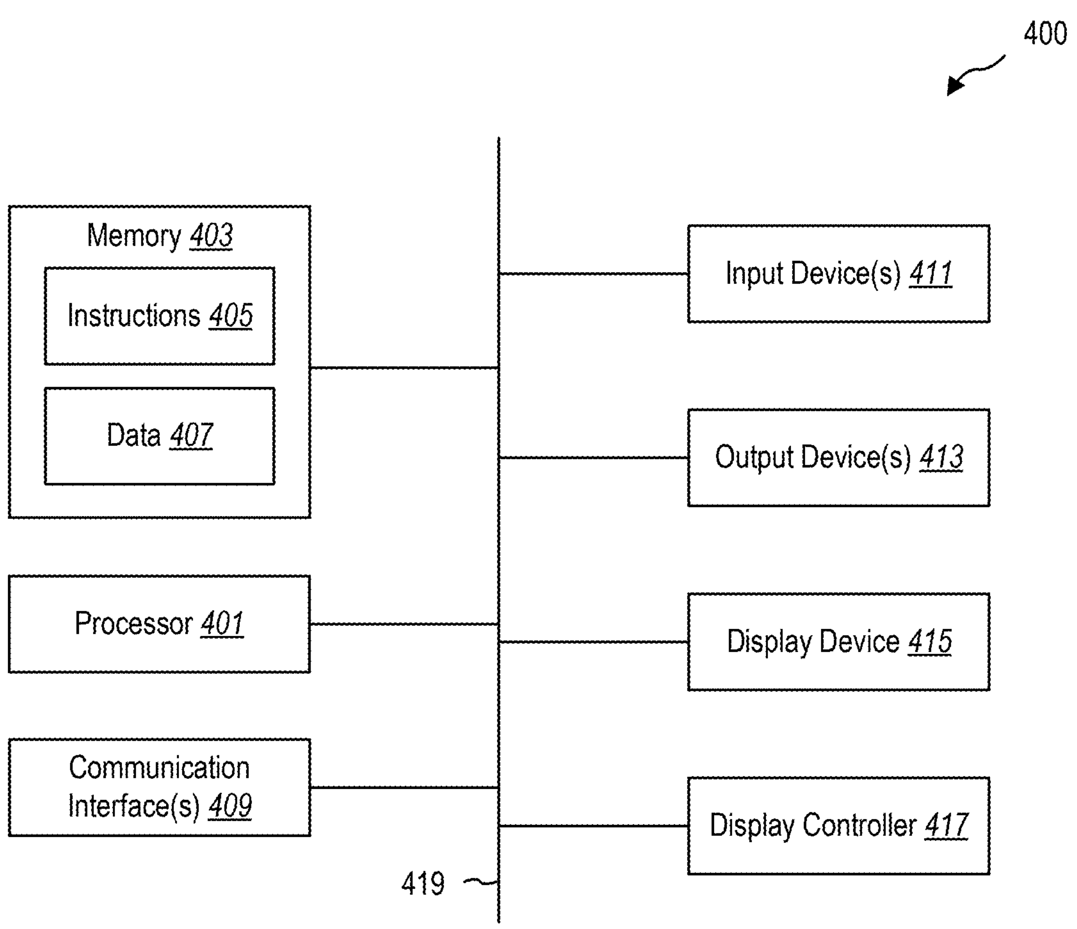
FIG. 4 illustrates components that may be included within a computer system.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

In some implementations, the various components of the computer system 400 are implemented as one device. For example, the various components of the computer system 400 are implemented in a mobile phone or tablet. Another example includes the various components of the computer system 400 implemented in a personal computer. Another example includes the various components of the computer system 400 implemented in the cloud. Another example includes the various components of the computer system 400 implemented on an edge device.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model, a generative model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:

receiving an input identifying a change in a collaboration graph representing collaborations among groups of individuals, wherein the change in the collaboration graph includes a modification of collaboration among the groups;

calculating, for each group within the collaboration graph in response to the change, a bridging index using an algorithm that analyzes communication signals of each group and measures external communications from each group to other groups in the collaboration graph, wherein the bridging index quantifies information flow from each group to other groups in the collaboration graph, wherein the algorithm is an approximation algorithm;

generating an insight using the bridging index for each group, wherein the insight is data representing a statistical change in an intensity of a communication path among groups in the collaboration graph;

presenting the insight, on a user interface, as an interactive graph view that, in response to a selection of a displayed group, presents the bridging index for the selected group; and performing, in response to an interaction received through the interactive graph, an action that modifies access permissions of individuals in the selected group.

2. The method of claim 1, wherein the algorithm excludes internal communications among individuals within a group from the bridging index calculation for the group.

3. The method of claim 1, wherein the algorithm traverses the collaboration graph in calculating the bridging index, wherein each node in the graph corresponds to a group and each edge represents communications from each node.

4. The method of claim 3, wherein each edge includes a weight that quantifies an amount of communications for each node in the collaboration graph and a sum of weights from each edge is used in calculating the bridging index for each node.

5. The method of claim 3, wherein the bridging index is calculated for each group before the change in the collaboration graph and after the change in the collaboration graph and the insight includes the before the change bridging index and the after the change bridging index.

6. The method of claim 1, wherein the modification of collaboration among the groups includes a change in intensity in communication among the groups, a new communication path established among the groups, and removing a communication path among the groups.

7. The method of claim 1, wherein the action includes modifying a flow of information in the collaboration graph between groups of the collaboration graph.

8. The method of claim 1, wherein the insight provides qualitative visualizations of the bridging index for each group in the collaboration graph.

9. The method of claim 1, wherein the insight provides information on a segment of a selected group with a contribution of the segment to the bridging index for the selected group.

10. The method of claim 1, wherein the interactive graph provides additional information for the selected group.

11. The method of claim 1, further comprising:

receiving a chart view request for the insight; and presenting, on the user interface, the insight in a chart that provides quantitative information of the bridging index for each group in the collaboration graph.

12. A device comprising:

a memory to store data and instructions; and a processor operable to communicate with the memory, wherein the processor is operable to:

receive an input identifying a change in a collaboration graph representing collaborations among groups of individuals, wherein the change in the collaboration graph includes a modification of collaboration among the groups;

calculate, for each group within the collaboration graph in response to the change, a bridging index in response to the change using an algorithm that analyzes communication signals of each group and measures external communications from each group to other groups in the collaboration graph, wherein the bridging index quantifies information flow from each group to other groups in the collaboration graph, wherein the algorithm is an approximation algorithm;

generate an insight using the bridging index for each group, wherein the insight is data representing a statistical change in an intensity of a communication path among groups in the collaboration graph;

present the insight, on a user interface, as an interactive graph view that, in response to a selection of a displayed group, presents the bridging index for the selected group; and perform, in response to an interaction received through the interactive graph, an action that modifies access permissions of individuals in the selected group, wherein modifying access permissions includes updating an access control list, a role assignment, or a permission set.

13. The device of claim 12, wherein the algorithm excludes internal communications among individuals within a group from the bridging index calculation for the group.

14. The device of claim 12, wherein the algorithm traverses the collaboration graph in calculating the bridging index, wherein each node in the graph corresponds to a group and each edge represents communications from each node, and wherein each edge includes a weight that quantifies an amount of communications for each node in the collaboration graph and a sum of weights from each edge is used in calculating the bridging index for each node.

15. The device of claim 12, wherein the modification of collaboration among the groups includes a change in intensity in communication among the groups, a new communication path established among the groups, and removing a communication path among the groups.

16. The device of claim 15, wherein the change in intensity in communication among the groups includes an increase in email communication among the groups, a decrease in email communication among the groups, an increase in meetings scheduled among the groups, a decrease in meetings scheduled among the groups, an increase in document collaboration among the groups, a decrease in document collaboration among the groups, an increase in sending messaging among the groups, and a decrease in sending messages among the groups.

17. The device of claim 12, wherein the action includes modifying a flow of information in the collaboration graph between groups of the collaboration graph.

18. The device of claim 12, wherein the insight provides qualitative visualizations of the bridging index for each group in an interactive graph and the interactive graph provides additional information for a selected group and the bridging index for the selected group in response to receiving a selection on the interactive graph.

19. The device of claim 12, wherein the insight is implemented as at least one type of data of a set of types that include a statistical change in a communication flow that impacts an organization network, a statistical change in an intensity of a communication path among groups in the collaboration graph, or quantitative information about changes in communication for a group before and after the change occurred in an organization network.

20. The device of claim 12, wherein the processor is further operable to:

present, on the user interface, the insight in a chart that provides quantitative information of the bridging index for each group and information on a segment of a selected group with a contribution of the segment to the bridging index for the selected group.

* * * * *